United States Patent [19]

Fischer

[11] Patent Number: 4,868,877
[45] Date of Patent: Sep. 19, 1989

[54] PUBLIC KEY/SIGNATURE CRYPTOSYSTEM WITH ENHANCED DIGITAL SIGNATURE CERTIFICATION

[76] Inventor: Addison M. Fischer, 60 14th Ave. South, Naples, Fla. 33942

[21] Appl. No.: 155,467

[22] Filed: Feb. 12, 1988

[51] Int. Cl.$^4$ .............................................. H04L 9/00
[52] U.S. Cl. ......................................... 380/25; 380/30
[58] Field of Search .................................... 380/23–25, 380/30

[56] References Cited

U.S. PATENT DOCUMENTS

| | | | |
|---|---|---|---|
| 4,405,829 | 9/1983 | Rivest et al. | 380/30 |
| 4,438,824 | 3/1984 | Mueller-Schloer | 380/25 |
| 4,471,163 | 9/1984 | Donald et al. | 380/30 |
| 4,625,076 | 11/1986 | Okamoto et al. | 380/30 |
| 4,633,036 | 12/1986 | Hellman et al. | 380/30 |
| 4,759,063 | 7/1988 | Chaum | 380/30 |
| 4,759,064 | 7/1988 | Chaum | 380/30 |
| 4,771,461 | 9/1988 | Matyas | 380/25 |
| 4,799,258 | 11/1989 | Davies | 380/23 |
| 4,811,393 | 3/1989 | Hazard | 380/23 |

OTHER PUBLICATIONS

Recommendation X.509 pp. 63–106, "The Directory Authentication Framework", CCITT & International Standards Organization, Apr. 1988.

Primary Examiner—Salvatore Cangialosi
Attorney, Agent, or Firm—Nixon & Vanderhye

[57] ABSTRACT

A public key cryptographic system is disclosed with enhanced digital signature certification which authenticates the identity of the public key holder. A hierarchy of nested certifications and signatures are employed which indicate the authority and responsibility levels of the individual whose signature is being certified. The present invention enhances the capabilities of public key cryptography so that it may be employed in a wider variety of business transactions, even those where two parties may be virtually unknown to each other. Counter-signature and joint-signature requirements are referenced in each digital certification to permit business transactions to take place electronically, which heretofore often only would take place after at least one party physically winds his way through a corporate bureaucracy. The certifier in constructing a certificate generates a special message that includes fields indentifying the public key which is being certified, and the name of the certifiee. In addition, the certificate constructed by the certifier includes the authority which is being granted including information which reflects issues of concern to the certifier such as, for example, the monetary limit for the certifiee and the level of trust which is granted to the certifiee. The certificate may also specify cosignature requirements which are being imposed upon the certifiee.

46 Claims, 6 Drawing Sheets

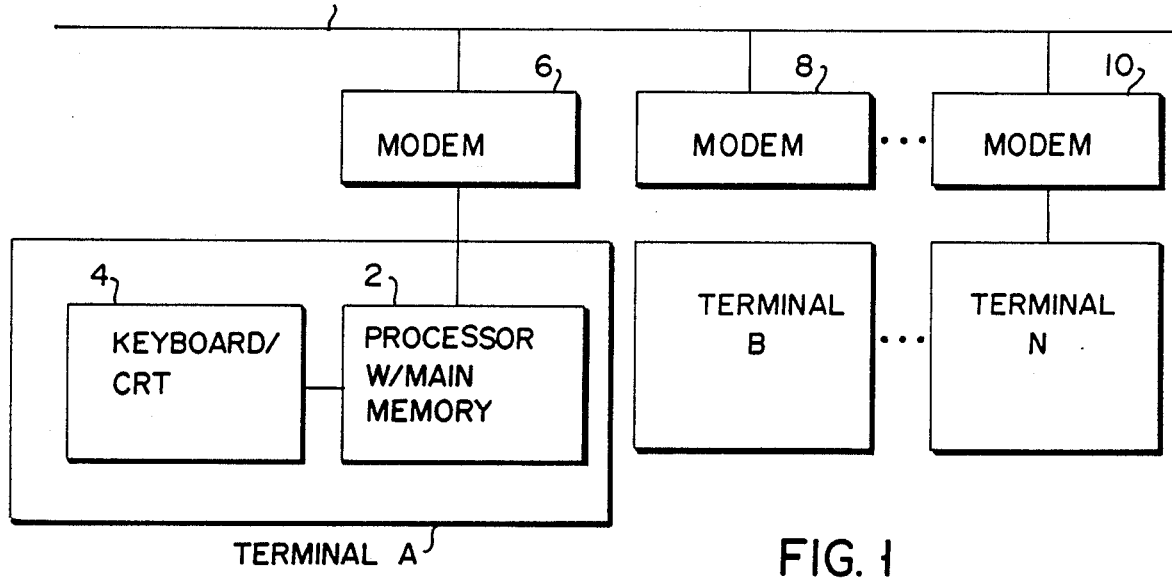
FIG. 1
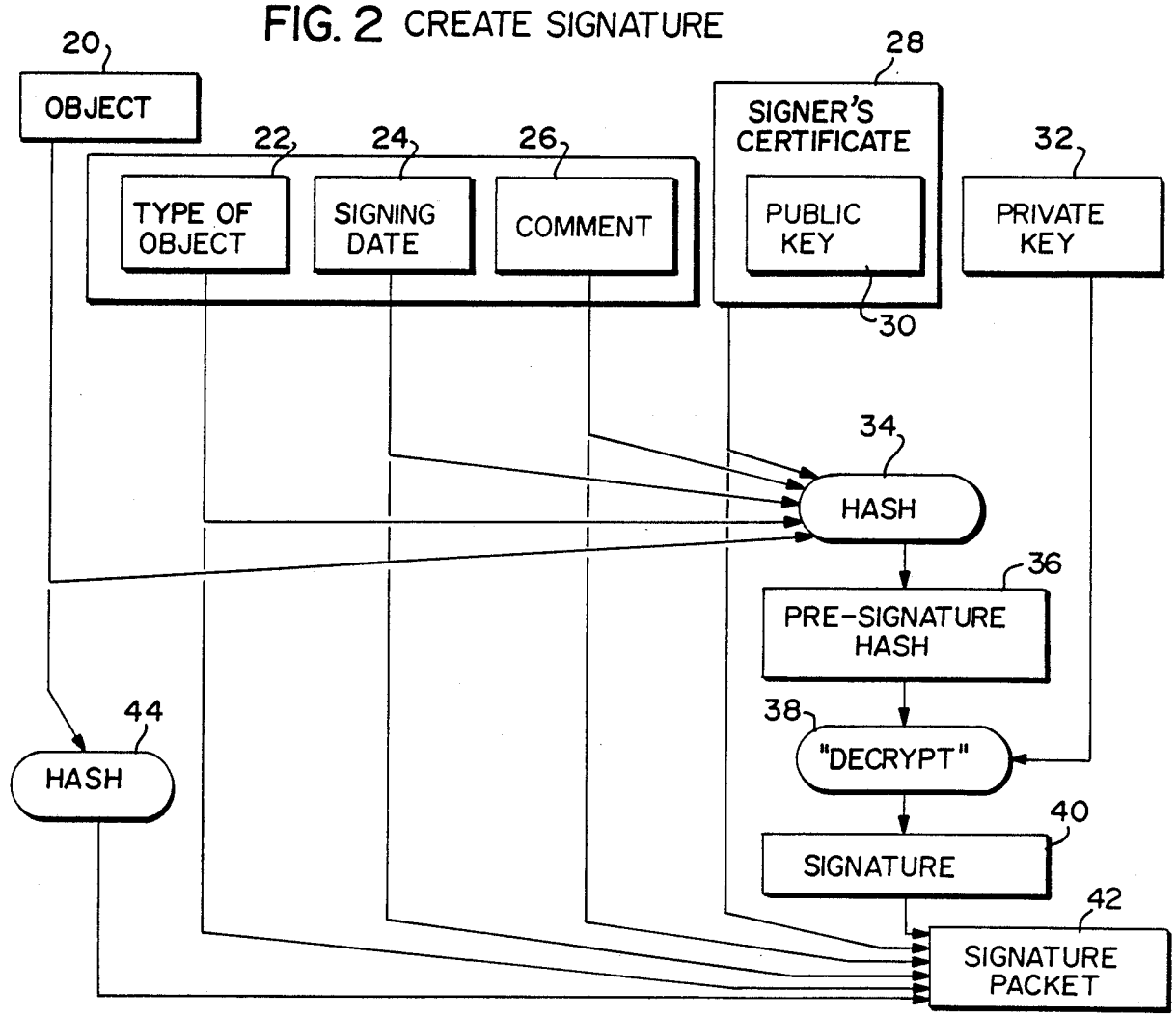
FIG. 2 CREATE SIGNATURE

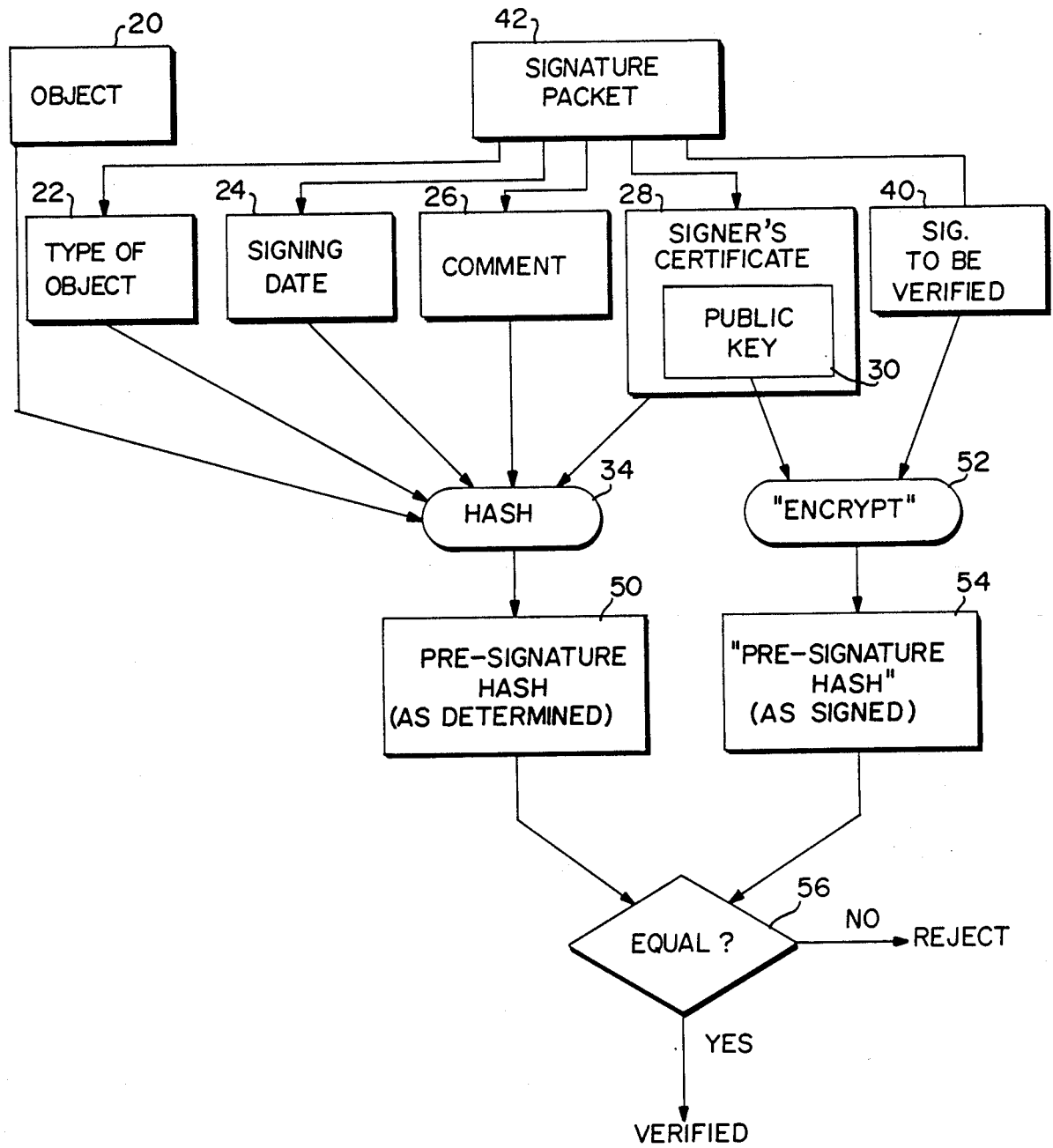

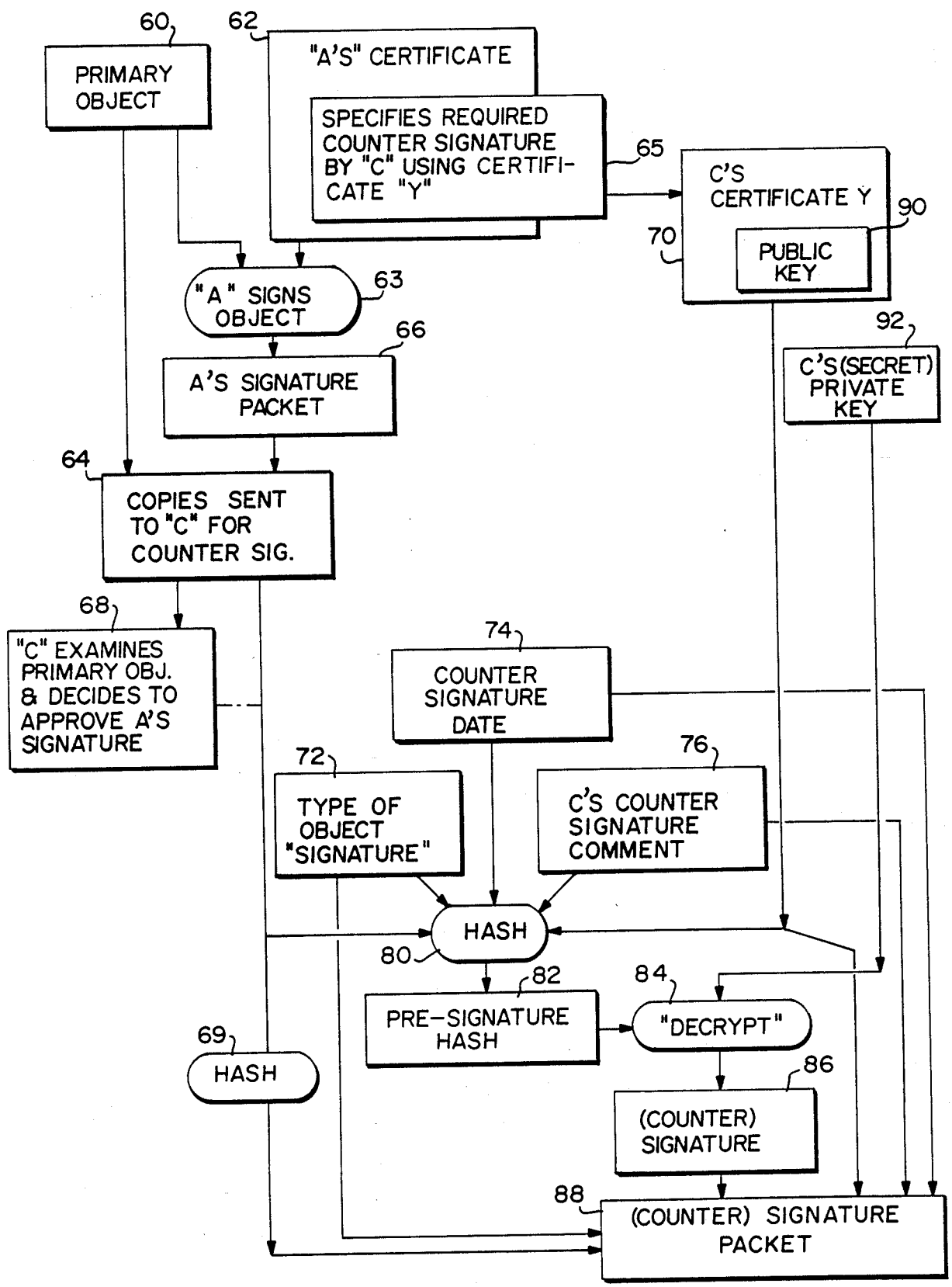
FIG. 4 "C" CREATES COUNTER-SIGNATURE FOR A'S SIGNATURE

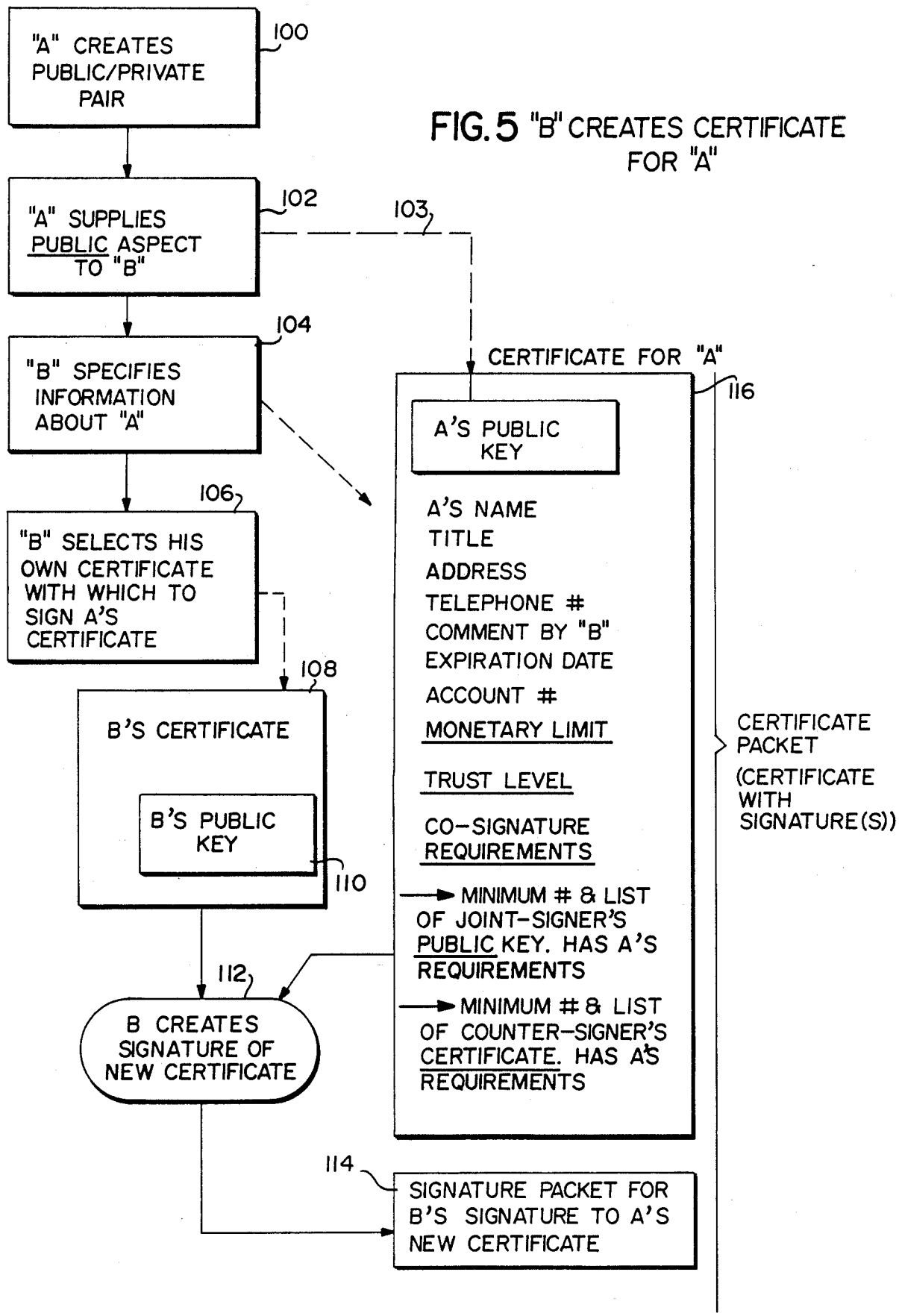

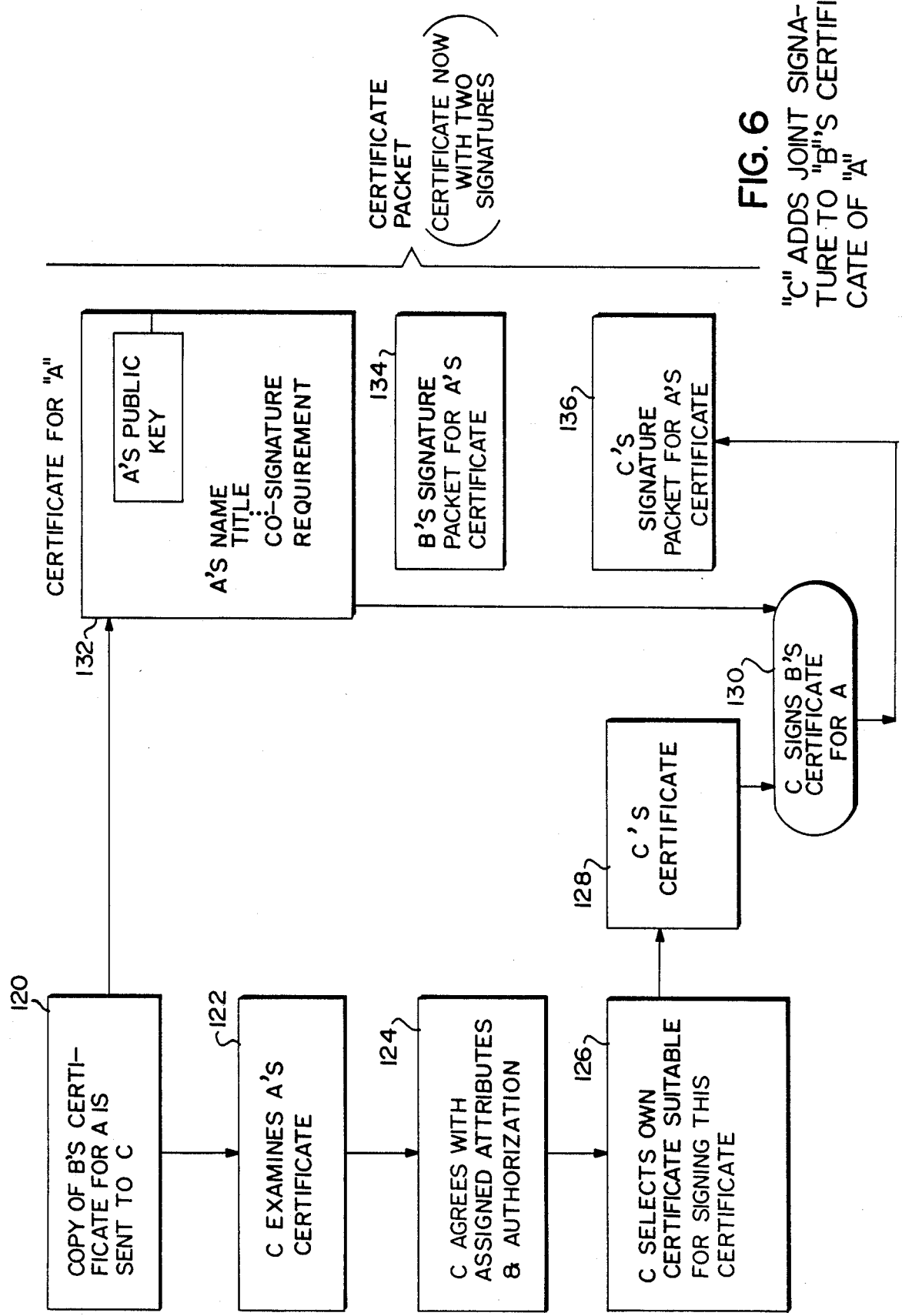

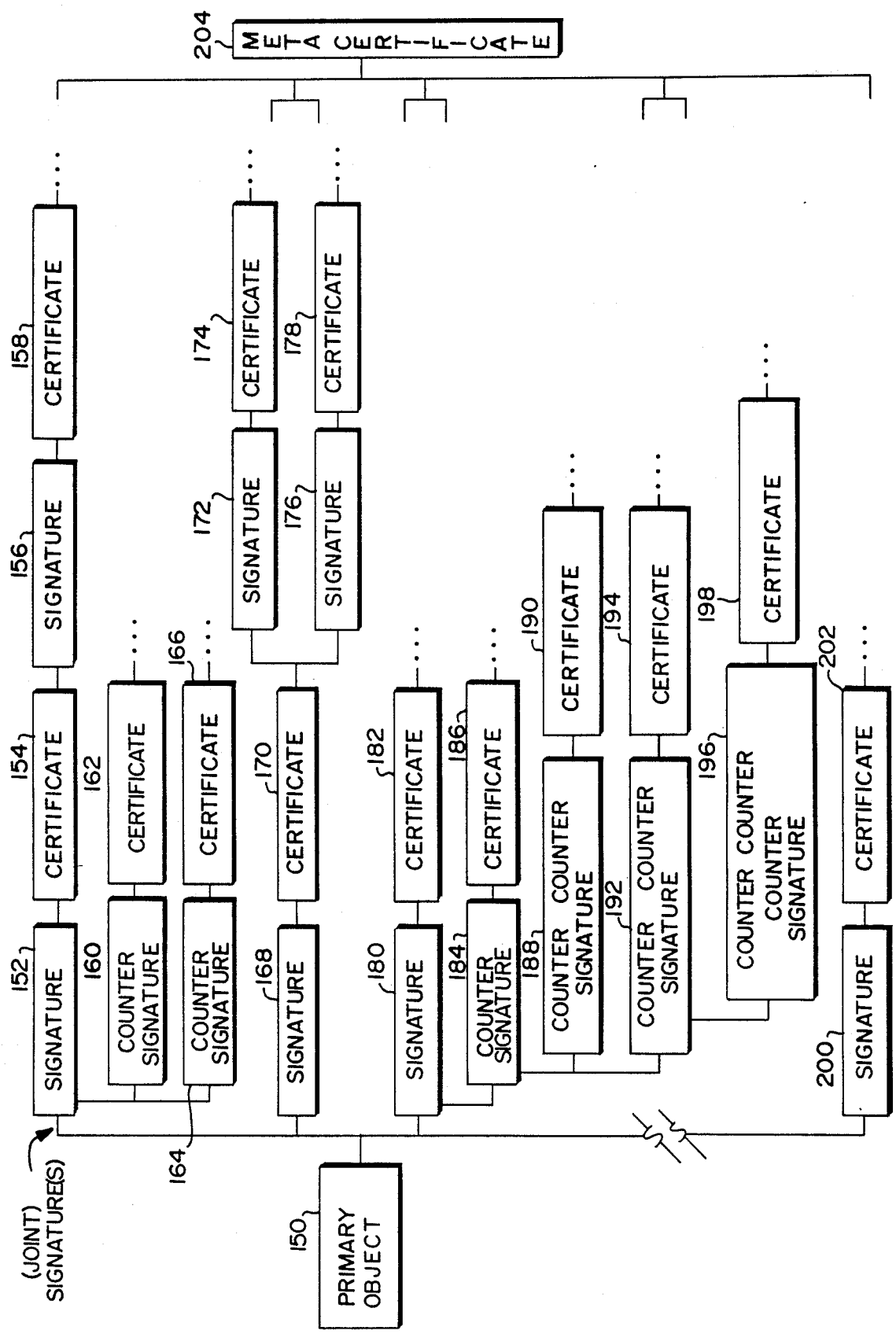
FIG. 7 VALIDATION STRUCTURE (EXAMPLE)

PUBLIC KEY/SIGNATURE CRYPTOSYSTEM WITH ENHANCED DIGITAL SIGNATURE CERTIFICATION

FIELD OF THE INVENTION

This invention relates to a cryptographic communications system and method. More particularly, the invention relates to a public key or signature cryptosystem having improved digital signature certification for indicating the identity, authority and responsibility levels associated with at least the sender of a digital message.

BACKGROUND AND SUMMARY OF THE INVENTION

The rapid growth of electronic mail systems, electronic funds transfer systems and the like has increased concerns over the security of the data transferred over unsecured communication channels. Cryptographic systems are widely used to insure the privacy and authenticity of messages communicated over such insecure channels.

In a conventional cryptographic system, a method of encryption is utilized to transform a plain text message into a message which is unintelligible. Thereafter, a method of decryption is utilized for decoding the encrypted message to restore the message to its original form.

Conventional cryptographic signature and authentication systems typically utilize a "one way" hashing function to transform the plain text message into a form which is unintelligible. A "hashing" function as used herein is a function which can be applied to an aggregation of data to create a smaller, more easily processed aggregation of data.

An important characteristic of the hashing function is that it be a "one-way" function. A hash is a "one-way" function, if it is far more difficult to compute the inverse of the hashing function than it is to compute the function. For all practical purposes, the value obtained from applying the hashing function to the original aggregation of data is an unforgeable unique fingerprint of the original data. If the original data is changed in any manner, the hash of such modified data will likewise be different.

In conventional cryptographic systems, binary coded information is encrypted into an unintelligible form called cipher and decrypted back into its original form utilizing an algorithm which sequences through encipher and decipher operations utilizing a binary code called a key. For example, the National Bureau of Standards in 1977 approved a block cipher algorithm referred as the *Data Encryption Standard* (DES). *Data Encryption Standard*, FIPS PUB 46, National Bureau of Standards, Jan. 5, 1977.

In DES, binary coded data is cryptographically protected using the DES algorithm in conjunction with a key. Each member of a group of authorized users of encrypted computer data must have the key that was used to encipher the data in order to use it. This key held by each member in common is used to decipher the data received in cipher form from other members of the group.

The key chosen for use in a particular application makes the results of encrypting data using the DES algorithm unique. Selection of a different key causes the cipher that is produced for a given set of inputs to be different. Unauthorized recipients of the cipher text who know the DES algorithm, but who do not have the secret key, cannot derive the original data algorithmically.

Thus, the cryptographic security of the data depends on the security provided for the key used to encipher and decipher the data. As in most conventional cryptographic systems the ultimate security of the DES system critically depends on maintaining the secrecy of the cryptographic key. Keys defined by the DES system include sixty-four binary digits of which fifty-six are used directly by the DES algorithm as the significant digits of the key and eight bits are used for error detection.

In such conventional cryptographic systems, some secure method must be utilized to distribute a secret key to the message sender and receiver. Thus, one of the major difficulties with existing cryptographic systems is the need for the sender and receiver to exchange a single key in such a manner that an unauthorized party does not have access to the key.

The exchange of such a key is frequently done by sending the key, prior to a message exchange, via, for example, a private courier or registered mail. While providing the necessary security such key distribution techniques are usually slow and expensive. If the need for the sender and receiver is only to have one private message exchange, such an exchange could be accomplished by private courier or registered mail, thereby rendering the cryptographic communication unnecessary. Moreover, if the need to communicate privately is urgent the time required to distribute the private key causes an unacceptable delay.

Public key cryptographic systems solve many of the key distribution problems associated with conventional cryptographic systems. In public key cryptographic systems the encrypting and decrypting processes are decoupled in such a manner that the encrypting process key is separate and distinct from the decrypting process key. Thus, for each encryption key there is a corresponding decryption key which is not the same as the encryption key. Even with knowledge of the encryption key, it is not feasible to compute the decryption key.

With a public key system, it is possible to communicate privately without transmitting any secret keys. The public key system does require that an encryption/decryption key pair be generated. The encryption keys for all users may be distributed or published and anyone desiring to communicate simply encrypts his or her message under the destination user's public key.

Only the destination user, who retains the secret decrypting key, is able to decipher the transmitted message. Revealing the encryption key discloses nothing useful about the decrypting key, i.e., only persons having knowledge of the decrypting can decrypt the message. The RSA cryptographic system which is disclosed in U.S. Pat. No. 4,405,829 issued to Rivest et al. discloses an exemplary methodology for a practical implementation of a public key cryptographic system.

A major problem in public key and other cryptographic systems is the need to confirm that the sender of a received message is actually the person named in the message. An authenticating technique known utilizing "digital signatures" allows a user to employ his secret key to "sign a message" which the receiving party or a third party can validate using the originator's public key. See for example U.S. Pat. No. 4,405,829.

A user who has filed a public key in a publicly accessible file can digitally sign a message by decrypting the message or a hash of it with the user's private key before transmitting the message. Recipients of the message can verify the message or signature by encrypting it with the sender's public encryption key. Thus, the digital signature process is essentially the reverse of the typical cryptographic process in that the message is first decrypted and then encrypted. Anyone who has the user's public encryption key can read the message or signature, but only the sender having the secret decryption could have created the message or signature.

Serious problems still persist in public key cryptosystems of assuring that a specified public key is that actually created by the specified individual. One known technique for addressing this problem is to rely on some trusted authority, e.g., a governmental agency, to insure that each public key is associated with the person who claiming to be the true author.

The trusted authority creates a digital message which contains the claimant's public key and the name of the claimant (which is accurate to the authority's satisfaction) and a representative of the authority signs the digital message with the authority's own digital signature. This digital message, often known as a certificate, is sent along with the user of the claimant's own digital signature. Any recipient of the claimant's message can trust the signature, provided that the recipient recognizes the authority's public key (which enables verification of the authority's signature) and to the extent that the recipient trusts the authority.

Prior to the present invention, the transmitted certificate failed to provide any indication of the degree of trust or the level of responsibility with which the sender of the message should be empowered. Instead, the certification merely indicates that the identified trusted authority recognized the sender's public key as belonging to that person.

The public key system is designed to operate such that the public keys of various users are published to make private communications easier to accomplish. However, as the number of parties who desire to use the public key system expands, the number of published keys will soon grow to a size where the issuing authority of the public keys can not reasonably insure that the parties whose public keys are published are, in fact, the people who they are claiming to be. Thus, a party may provide a public key to be maintained in the public directory under the name of the chairman of a major corporation, e.g., for example, General Motors Corporation. Such an individual may then be in a position to receive private messages directed to the chairman of General Motors or to create signatures which ostensibly belong to the impersonated chairman.

There are also technologies for producing digital signatures which may not require full public key capability, including, for example, the Fiat-Shamir algorithm. Any digital signature methodology may be employed to implement the digital signatures referenced herein. Any reference to public key cryptosystems should also be construed to reflect signature systems. Any reference to public key decryption should be taken as a generalized reference to signature creation and any reference to encryption should be taken as a reference to signature verification.

The present invention addresses such problems with the public key or signature cryptographic system relating to authenticating the identity of the public key holder by expanding the capability of digital signature certification. In this regard, a certification methodology is utilized which employs multiple level certification while at the same time indicating the authority and responsibility levels of the individual whose signature is being certified as is explained in detail below.

The present invention enhances the capabilities of public key cryptography so that it may be employed in a wider variety of business transactions, even those where two parties may be virtually unknown to each other.

The digital signature certification method and apparatus of the present invention provides for a hierarchy of certifications and signatures. It also allows for co-signature requirements. In this regard, counter-signature and joint-signature requirements are referenced in each digital certification to permit business transactions to take place electronically, which heretofore often only would take place after at least one party physically winds his way through a corporate bureaucracy.

In the present invention, a digital signature is certified in a way which indicates the authority the has been granted to the party being certified (the certifiee). The certifier in constructing a certificate generates a special message that includes fields identifying the public key which is being certified, and the name of the certifiee. In addition, the certificate constructed by the certifier includes the authority which is being granted and limitations and safeguards which are imposed including information which reflects issues of concern to the certifier such as, for example, the monetary limit for the certifiee and the level of trust which is granted to, the certifiee. The certificate may also specify co-signature requirements as being imposed upon the certifiee The present invention further provides for certifying digital signatures such that requirement for further joint certifying signatures is made apparent to any receiver of a digital message. The requirement for joint signatures is especially useful in transactions where money is to be transferred or authorized to be released. To accomplish this end, the certificate of the present invention is constructed to reflect (in addition to the public key and the name of the certifiee and other fields) the number of joint signatures required and an indication as to the identity of qualifying joint signers. Thus, an explicit list of each of the other public key holders that are required to sign jointly may be included in the certificate. In this fashion, the recipient is informed that any material which is signed by the authority of the sender's certificate, must also be signed by a number of other specified signators. The recipient is therefore able to verify other joint and counter signatures by simply comparing the public keys present in each signature in the certificate. The present invention also includes other ways of indicating co-signature requirements such as by indicating other certificates. Such indications of other public key holders may be explicit (with a list as described here), or implicitly, by specifying some other attribute or affiliation. This attribute or affiliation may also be indicated in each co-signer' certificate.

Additionally, the present invention provides for the certification of digital signatures such that a trust level is granted to the recipient for doing subcertifications. In this manner, a trust level of responsibility flows from a central trusted source.

In an exemplary embodiment of the present invention, a certifier is permitted to assign with one predetermined digital code a trust level which indicates that the certifier warrants that the user named in the certificate is known to the certifier and is certified to use the associated public key. However, by virtue of this digital code, the user is not authorized to make any further identifications or certifications on the certifier's behalf. Alternatively, the certifier may issue a certificate having other digital codes including a code which indicates that the user of the public key is trusted to accurately identify other persons on the certifier's behalf and is further trusted to delegate this authority as the user sees fit.

The present invention further provides for a user's public key to be certified in multiple ways (e.g., certificates by different certifiers). The present invention contemplates including the appropriate certificates as part of a user's signed message. Such certificates include a certificate for the signer's certifier and for the certifiers' certifier, etc., up to a predetermined certificate which is trusted by all parties involved. When this is done, each signed message unequivocally contains the ladder or hierarchy of certificates and the signatures indicating the sender's authority. A recipient of such a signed message can verify that authority such that business transactions can be immediately made based upon an analysis of the signed message together with the full hierarchy of certificates.

BRIEF DESCRIPTION OF THE DRAWINGS

These as well as other features of this invention will be better appreciated by reading the following description of the preferred embodiment of the present invention taken in conjunction with the accompanying drawings of which FIG. 1 is a exemplary block diagram of a cryptographic communications system in accordance with an exemplary embodiment of the present invention;

FIG. 2 is a flow diagram that indicates how a digital signature is created in accordance with an exemplary embodiment of the present invention;

FIG. 3 is a flow diagram that indicates how a digital signature created in accordance with FIG. 2 is verified;

FIG. 4 is a flow diagram that indicates how a countersignature is created for a digital signature;

FIG. 5 is a flow diagram that indicates how a digital certificate in created in accordance with an exemplary embodiment of the present invention;

FIG. 6 is a flow diagram that indicates how a joint signature is added to a certificate; and FIG. 7 is a flow diagram that indicates how the signatures and certificates are verified by a recipient of the transmitted message.

DETAILED DESCRIPTION OF THE PRESENTLY PREFERRED EMBODIMENT

FIG. 1 shows in block diagram form an exemplary communications system which may be used in conjunction with the present invention. This system includes an unsecured communication channel 12 over which communications between terminals A,B . . . N may take place. Communication channel 12 may, for example, be a telephone line. Terminals A,B through N may, by way of example only, be IBM PC's having a processor (with main memory) 2 which is coupled to a conventional keyboard/CRT 4. Each terminal A,B through N also includes a conventional IBM PC communications board (not shown) which when coupled to a conventional modem 6, 8, 10, respectively, permits the terminals to transmit and receive messages.

Each terminal is capable of generating a plain text or unenciphered message, transforming the message to an encoded, i.e., enciphered form, and transmitting the message to any of the other terminals connected to communications channel 12 (or to a communications network (not shown) which may be connected to communications channel 12). Additionally, each of the terminals A,B through N is capable of decrypting a received enciphered message to thereby generate a message in plain text form.

Each of the terminal users (as discussed above with respect to public key systems) has a public encrypting key and an associated private secret decrypting key. In the public key cryptosystem shown in FIG. 1, each terminal user is aware of the general method by which the other terminal users encrypt a message. Additionally, each terminal user is aware of the encryption key utilized by the terminal's encryption procedure to generate the enciphered message.

Each terminal user, however, by revealing his encryption procedure and encryption key does not reveal his private decryption key which is necessary to decrypt the ciphered message and to create signatures. In this regard, it is simply not feasible to compute the decryption key from knowledge of the encryption key. Each terminal user, with knowledge of another terminal's encryption key, can encrypt a private message for that terminal user. Only the terminal end user with his secret decrypting key can decrypt the transmitted message.

Besides the capability of transmitting a private message, each terminal user likewise has the capability of digitally signing a transmitted message. A message may be digitally signed by a terminal user decrypting a message with his private decrypting key before transmitting the message. Upon receiving the message, the recipient can read the message by using the sender's public encryption key. In this fashion, the recipient can verify that only the holder of the secret decryption key could have created the message. Thus, the recipient of the signed message has proof that the message originated from the sender. Further details of a digital signature methodology which may be used in conjunction with the present invention is disclosed in U.S. Pat. No. 4,405,829.

Before describing the details of the enhanced digital certification in accordance with the present invention, the general operation of FIG. 1 in an electronic mail, public key cryptographic context will initially be described. Initially, presume that the user of terminal A is a relatively low level supervisor of a General Motors computer automated design team who wishes to purchase a software package from a computer software distributor located in a different state. The computer software distributor has terminal N and an associated modem 10 located at his store.

The General Motors supervisor at terminal A constructs an electronic purchase order which identifies the item(s) being ordered and the address to which the items must be sent as well as other items which are necessary in a standard purchase order. It should be recognized that, although this example relates to an electronic purchase order, any aggregation of data which can be represented in a manner suitable for processing with whatever public-key method is being used for signatures may likewise be transmitted. In the more detailed description which follows such an aggregation of data, e.g., a computer data file, will generically be referred to as an "object".

The terminal A user, the General Motors supervisor, digitally signs the purchase order under the authority of a certificate which is appended to the transmitted message which will be discussed further below. Turning first to the supervisor's digital signature, a message can be "signed" by applying to at least a portion of the object being signed, the privately held signature key. By signing an image of the object (or a more compact version thereof known as a digest or hash of the object to be explained in more detail below) with the secret key, it is possible for anyone with access to the public key to encrypt this result and compare it with the object (or a recomputed hash or digit version thereof). Because only the owner of the public key could have used the secret key to perform this operation, the owner of the public key is thereby confirmed to have signed the message.

In accordance with the present invention, a digital signature is additionally accompanied by at least one valid certificate which specifies the identity of the signer and the authorization which the signer has been granted. The certificate may be viewed as a special object or message which specifies the identity of the user of a particular public key and the authority which has been granted to that user by a party having a higher level of authority than the user.

To be valid a certificate must be signed by the private key(s) associated with one or more other valid certificates which are hereafter referred to as antecedents to that certificate. Each of these antecedent certificates must grant the signer the authority to create such a signature and/or to issue the purchase order in our example. Each of the antecedent certificates may in turn have its own antecedent(s).

An exemplary embodiment of the present invention contemplates utilizing an ultimate antecedent certificate of all certificates, which is a universally known and trusted authority, e.g., hypothetically the National Bureau of Standards, and which is referred to as a meta-certificate. The meta certificate is the only item that needs to be universally trusted and known. There may be several meta-certifiers, and it is possible that meta-certificates may even reference each other for required co-signatures.

Turning back to our example, when the message is ultimately transmitted from terminal A to the computer software distributor at terminal N, the recipient in a manner which will be described in detail below, verifies the signature of the General Motors supervisor. Additionally, he verifies that all the other signatures on the message certificate and the antecedent certificates are present which provides further assurance to the terminal N software distributor that the transaction is a valid and completely authorized. As should be recognized, such assurances are critically important prior to shipping purchased items and are perhaps even more important in an electronic funds transfer context.

Any party who receives a message transmitted by the user of terminal A (whether such a party is the ultimate recipient of the message at terminal N or other parties within for example a corporate hierarchy such as General Motors) can verify and validate A's signature and the authority that the terminal A user exercised. Such validation is possible since a complete hierarchy of validating certificates is transmitted with the original purchase order which permits the ultimate recipient to feel confident that the requested transaction is authentic and properly authorized.

Focussing more generically on major transactions emanating from, for example, General Motors Corporation, it is helpful to focus first on the ultimate certifier(s) mentioned above, i.e., the meta-certifiers. In this regard, General Motors and parties who plan to do business with General Motors or otherwise participate in the public key cryptosystem may initially choose to approach a universally recognized trusted authority e.g., hypothetically the Bureau of Standards and/or one of the country's largest banks. Corporate and other participants in this system register a set of public keys (which they are authorized to use by virtue of an action of their corporate board of directors) with the meta-certifier. These are "high level" keys to be used within the General Motors environment primarily for certifying General Motors' internal personnel. The meta-certifier in return distributes to General Motors its certification that each of these supplied public keys created by General Motors is authorized for their own use. In effect, the meta-certifier is certifying that the party using each key is actually associated with General Motors. The meta-certifier's certification may include embedded text which indicates that the users of registered public keys are properly associated with General Motors. For example, General Motors may decide to have three "high level" keys certified, e.g., corporate officers, such as the vice president, financial officer, and the security officer. At General Motors' request each of the three certificates indicate the public keys of the other two as required joint signatures.

Thus, once having obtained the highest level certificate(s) from the meta-certifier, several officials within General Motors may have to jointly sign certificates at the next lower level and such joint signatures. Each of these high level General Motors' certificates would mutually reference each other as required co-signers At this level no single corporate officer acting alone may authorize anything because embedded within each of the three certificates is a requirement for the signature of others who are specifically identified. In turn then, these 3 officers create and sign public keys for the other General Motors' employees, that define exactly the level of authority, responsibility and limitations each employee is to have. One of these certificates may belong to user A, or will be an antecedent to user's A's certificate.

Each of these three high level certificates may digitally sign terminal B user's certificate preferably after a face to face or telephone verification. After each of the required signatures has been created, the certificate's signatures by the vice president, financial officer and security officer as well as their respective 3 certificates, as well as those certificates' respective signatures by the meta-certifier are ultimately returned to the General Motors' supervisor at terminal B to be stored for ongoing use, such as in our example for subcertifying terminal user A. In this manner, the signed message unequivocally contains the ladder or hierarchy of certificates and signatures verifying terminal A user's identify and his authority.

When a party B in a ladder of certifications creates an authorizing certificate for party A, the certificate includes a specification of A's identity together with A's public encryption key. Additionally, the certificate indicates the authority, capabilities and limitations which B wishes to grant A. By granting this certificate B explicitly assumes responsibility for both A's identity and authority.

B's certificate for A also permits a specification of other parties who are required to cosign actions taken by A when using this certificate as will be explained further below. Cosignatures may take the form of either joint signatures or countersignatures. Additionally party B can define in the certificate for A the degree to which B will recognize subcertifications performed by A.

In accordance with an exemplary embodiment of the present invention, trust levels which are granted by the certifier to the certifiee are specified in the certificate by a predetermined digital code. Such a trust level is used by the recipient of the message as an indicator of the authority granted to the certifiee and the responsibility assumed by the certifier for the certifiee's actions with respect to the use of the public key being certified.

By way of example only trust levels may be indicated by trust level values 0, 1, 2, and 3.

Trust level 0 indicates that the certifier vouches that the certified public key belongs to the individual named in the certificate; but that the certifier will not assume responsibility for the accuracy of any certificates produced by the certifiee. The essence of this would be a statement by the certifier that: "I warrant the user named in this certificate is known to me and is being certified to use the associated public key—however I do not trust him to make any further identifications on my behalf".

Trust level 1 empowers the certifiee to make level 0 certifications on behalf of the certifier. The essence of this would be a statement by the certifier that: "I know the user of this public key and I trust him/her to accurately identify other persons on my behalf. I will take responsibility for such identifications. However, I do not trust this person to identify persons as trustworthy."

Trust level 2 empowers the certifiee to make level 0, 1 and 2 certifications on behalf of the certifier. The essence of this would be a statement by the certifier that: "I know the user of this public key and I trust him/her to accurately identify other persons on my behalf, and I furthermore trust them to delegate this authority as they see fit. I assume due responsibility for any certifications done by them or any duly authorized agent created by them or by other generation of duly created agents".

Trust level 3 is reserved exclusively for an ultimate meta certifier whose public key and certificate is established and also well known (possibly by repetitive and widespread media publication) and whose accuracy is universally respected. This certifier takes responsibility only for accurately identifying the entities whose public keys it certifies. It assumes no responsibility for the use of these keys.

Additionally, each certification may specify the monetary limit, i.e., the maximum amount of money value which the certifiee is authorized to deal with. The monetary limit must not of course exceed the limit in the certifier's own certificate to insure that the certifier does not delegate more than he is allowed to handle.

Before discussing further details of the digital signature and certification techniques of the present invention, it may be helpful to first define certain terminology. As noted above, the term "object" is generically used to describe any aggregation of data that can be ultimately represented in a manner suitable for processing with whatever public key method is being utilized for signatures and/or encryption. The term object may apply to a "primary" object such as a purchase order or check, or money transfer; or to a "secondary" object such as a certificate, or another signature.

The methodology of the present invention in order to increase processing efficiency generally applies a function to the object to create a generally smaller, more compact, more easily processed object, i.e., typically a fixed size bit string of several dozen or more bits. Such a function is referred to as a hash or digest of the object.

An example of such a hash or digest would be the output obtained by processing an image of the object with the data encryption standard (DES) using cipher block chaining mode (CBC). Processing may be done with two different DES keys (both of which are fixed, non-secret and commonly known). Thereafter, each of the final output chaining values are concatenated or merged in some way to become the several dozen or more bits constituting the digest or hash value.

An important characteristic of the digest or hashing algorithm is that, while it is easy to compute the digest of an object it is essentially impossible to construct a different or modified object with an equal digest. For all practical purposes the digest is an unforgeable unique fingerprint of the original object. If the original object is changed in any manner, the digest will be different. In other words, for all practical purposes, the more compact representation of the original object is unique to the original object. Ideally, also a hash should not reveal any clue about specific data values contained within the message. The hash's contemplated in the exemplary embodiment have at least 128 bits.

Turning now to FIG. 2, this figure shows the data flow and the manner in which signatures are created. The signature process applies not only to general objects such as arbitrary computer files, letters, electronic purchase orders, etc., but also to specialized objects such as signatures and certificates.

Each digital signature is accompanied, as is generally shown in FIG. 2, by a certification of the public key performing the signature. The certificate, as will be discussed in detail in conjunction with FIG. 5, is signed by one or more higher authorities (i.e., the immediate certifiers) and identifies the original signer while specifying the degree of authority which has been granted to the original signer.

In accordance with the present invention, the original signer may have more than one certificate and may utilize different certificates for different levels of authority. Each of the certificates may carry different limitations and requirements including different money limitations, trust levels, joint signature requirements and counter signature requirements.

It is incumbent on the signer to select the appropriate signature/certificate with which to sign a particular object. For example, purchase orders may require a different type of authority (and therefore a different certificate) than merely a letter of inquiry. Thus, the certificate is a very important portion of the transmitted message in that it identifies the signer as well as the signer's level of authority.

As shown in FIG. 2, in creating the signature the user utilizes the object 20 (which may, for example, be a purchase order) and specifies the type of object 22. The documentation added under the type of object field, for example, indicates that the object is a purchase order data file. In other instances the type of object field 22 would identify that the object is another signature or a certificate. As indicated at 24, the date of the signature is also identified.

The comment field 26 is utilized to add documentation which, for example, places limitations on the signature or adds other commentary. The signer may indicate that his signature or the object is only good and valid for a predetermined period of time. Additionally, any desired comments regarding the particular transaction, e.g., the purchase order, may be added as comment data.

Also incorporated in the signature is the original signer's certificate 28 which includes the original signer's public key 30 and numerous other fields which are discussed in detail below in conjunction with FIG. 5. As noted above, public key signature methods require the use of a public key 30 and an associated private key which is shown in FIG. 2 at 32.

The object field 20 (e.g., purchase order data), the type of object field 22, the signing date field 24, the comment field 26, and the signer's certificate field 28 are hashed via a hashing algorithm at 34 to enhance processing efficiency. Additionally, each of the fields 20, 22, 24, 26 and 28 are incorporated in the signature packet 42 to become part of the signature record. A hashing algorithm 44 is also applied to the object 20 to place it in a more compact form prior to incorporation in the packet 42.

After application of the hashing algorithm 34 to the fields previously discussed, a presignature hash results therefrom as indicated at 36. The presignature hash 36 is then run through a decrypt (signature) cycle as indicated at 38 using the signer's private key 32 to thereby result in the signer's signature 40. The signer's signature 40 together with items 20 (or the hash of 20), 22, 24, 26 and 28 become the final signature packet 42.

When this signature is transmitted with the associated object, it allows the recipient to verify that the object is intact as it was signed. Furthermore, when sufficient certificates are also included, the recipient can validate the true identity of the signer and the authority which has been granted in the signer's chain of certificates.

Turning now to FIG. 3, this figure shows how a recipient of the transmitted message, including the signature packet 42 constructed in accordance with FIG. 2, verifies the signature. As shown in FIG. 3, the recipient utilizes the signature packet 42 and the associated fields 22, 24, 26 and 28 as well as the object 20 and applies the same hashing algorithm 34 as applied to these same fields in FIG. 2 to thereby result in a presignature hash 50.

The recipient then utilizes the public encrypting key transmitted with the signer's certificate 28 and performs an encrypt (verification) operation 52 on the signature to be verified 40 (which was transmitted with the signature packet) to thereby generate a presignature hash 54. The recipient, by recomputing the presignature hash in the same way as the signer, then compares this value with the encryption (verification) of the signer's signature.

As indicated at block 56, if these two values at 50 and 54 are not equal, the recipient cannot accept the received signature as being valid. Whether intentional or otherwise, the object and/or the signature must have been changed or tampered with in some way since they were signed. By virtue of this verification step, the recipient determines that the digital signal is consistent with the public key that was named.

In this manner, the object and its signature are processed to insure that the object is identical to the data which existed as it was signed by the owner of the public key. This is the first step of an overall validation process.

Other steps in the validation process insure that the public key belongs to the person named in the associated certificate and that the person has the authority stipulated in the certificate. This verification process applies generally to any object even if that object is another signature or a certificate. To complete the validation process, the recipient analyzes the certificates associated with the signature to determine that the proper authority has been conveyed to each certificate through its signatures and the antecedent certificate(s) of these authorizing signatures.

An object may be accompanied by more than one signature. Such cosignatures fall into the category of either a joint signature or a counter signature. A joint signature is simply another signature of an object by a different party. The signature process is no different than that used to create the initial signature as described in conjunction with FIG. 2.

A counter signature is a signature of a signature. Thus, when A signs an object, this signature may itself be thought of as an object. Thus, when C countersigns A's signature, the object C is signing is A's signature itself rather than the original object. The counter signature must therefore occur after the signature being countersigned and reflects approval (or at least recognition) of both the underlying object as well as the fact that A has signed that object. This mechanism allows a chain of authority where each higher level approves any commitment made at a lower level. One of the unique aspects of this system is that the certificate A associates with this signature may in fact require that the use of A's signature be accompanied by particular other joint or counter signatures.

Turning next to the creation of a counter signature which is shown in FIG. 4, initially A signs at 63 a primary object 60 in accordance with the procedure outlined in detail in conjunction with FIG. 2. The primary object 60 may be a purchase order or some other commitment or it may be a counter signature of some other signature of a primary object.

As explained above in regard to FIG. 2, the process of A signing an object may also involve some other party signing A's signature. Thus, A's certificate 62 specifically defines at 65 that, in order for A's signature to be valid (i.e., ratified), a counter signature by C is required, for example, using C's specific certificate Y.

After A signs the object, A's signature packet 66 is then forwarded along with the primary object and all associated signatures and certificates to C and A requests that C add his counter signature 64. Upon receiving the material, C reviews all existing signature certificates and the primary object and if everything meets with his approval he would decide to sign A's signature 68. A's signature inherently reflects the primary object and C's signature inherently reflects A's signature so C will essentially have "signed on the line below A's signature".

Once C decides to approve A's signature at 68, the process of creating a signature as shown in detail in FIG. 2, is duplicated except that the object is A's signature. Thus, with A's signature as the object (and the type of object being designated as a signature at 72), the counter signature date 74, C's counter signature comment 76, and C's certificate 70 are applied to a hashing algorithm 80 to thereby result in a presignature hash 82. At the same time, these fields are also inserted into the counter signature packet 88 as discussed above with respect to the signature packet 42 (with a hashing algorithm 69 being applied to the signature object).

Presignature hash 82 and C's secret key 92 are applied in a signature operation 84 to generate a counter signature 86. This counter signature becomes part of the counter signature packet 88 in precisely the same fashion as described previously in regard to the creation of signature packet 42 in FIG. 2.

Because the certificate "Y" which C must use to perform the signature has been explicitly stated (in the certificate which A used to sign), C may also be required to meet his own cosignature obligations so specified by "Y" and forward this entire package including his own newly added signature on to other parties for further cosignatures (either joint or counter signatures). This recursive signature gathering process continues until sufficient signatures are added to fully satisfy all cosignature requirements of at least one party who initially signed the primary object.

Turning next to how one party creates an authorizing certificate for another, it is noted that B creates an authorizing certificate for A by combining a specification of A's identity together with the public encrypting key which A generated for himself. Additionally B specifies the authority capabilities and limitations which B wishes to grant A. By signing the certificate B explicitly assumes responsibility for A's identity and authority.

The present invention permits B to specify other signators who are required to cosign actions taken by A when using the certification. As noted above, B can further define in the certificate for A the degree to which B will recognize subcertifications performed by A.

Additionally, many other limitations and restrictions may be imposed by B. For example, B may impose a money limit which will insure that any recipient of A's certificate will be aware of the limit B is willing to authorize. Since the process of creating a certificate, as will be shown below involves signatures, the use of cosignatures is extended to permit certification authorization. For example, certificates may be designed to allow delegation of subcertification, but only if particular multiple cosigners are involved. This allows checks and balances to be structured into a hierarchy of authority so that electronic digital signatures can be used across organization and institutional boundaries with great confidence—both by the parties receiving the signatures and the parties granting the authority to use the signatures.

The manner in which a party B creates a certificate for party A is shown in FIG. 5. As indicated at 100, A creates a public/private key pair in accordance with conventional public key signature systems and supplies the public key to B 102. Once B obtains the public key provided by A for certification, it is important for B to insure that the public key is actually one generated by A and not someone masquerading as A. In this regard, it may be desirable for the public key generated by A to be provided on a face to face basis.

Having selected his own certificate with which to sign A's certificate, B at 106 utilizes the certificate 108 with the associated public key 110 to create a signature of a new certificate 112. As in FIG. 2, the signature is created using an object (A's certificate 116) and a certificate (B's certificate 108). B's secret private key is utilized in the decrypt operation to create the signature 112 of the new certificate 116 and the signature packet 114 of B's signature becomes part of A's new certificate packet.

Focussing on the certificate for A which is constructed using information about A specified by B, B builds the certificate by utilizing the public aspect of A's public key as provided by A via line 103. B also sets forth A's full name, A's title and other important statistics such as his address, and telephone number. B may also include a comment to go with the certification which will be available to any person in the future who needs to examine A's certificate.

B additionally will indicate an expiration date of the certificate. This date may reflect the date after which A should not use the certificate. Alternatively, the date may call for any certificate created by A to also expire on this date. B may also indicate in the certificate an account number for A which may represent an internal identification code within B's organization.

Additionally, B may place a monetary limit in the certificate. This monetary authority or credit limit is checked against the limit in B's own certificate to insure that B does not delegate more than he is empowered to delegate. This same relationship is also verified by future recipients as part of their validation process.

As discussed above, B also defines the degree of responsibility to which B is willing is assume for subcertifications done by A. This field must be compatible with the trust level which is allowed B's own certificate. The relationship between the trust level granted to B and that granted by B is another of the relationships validated whenever future recipients validate the hierarchy of certificates which are presented to them.

Finally B inserts cosignature requirements into A's certificate which specify how many and what type of cosignatures are required to accompany A's signature when A uses this new certificate. As indicated above, cosignatures may be in the form of joint signatures and/or counter signatures. The counter signature indicates an approval of the use of the certificate and the approval necessarily follows the associated signature. Joint signatures can be done in any order and do not necessarily reflect approval of the other signatures, but simply approval (or recognition) of a common object.

Cosignature requirements may, for example, be specified in the certificate in a variety of ways. One technique which may be used is to explicitly define a list of valid joint signers and a list of valid counter signers. Associated with each list is the number specifying the minimum associated signatures which must be present in order for a recipient to recognize the signature as being fully approved. The joint signature list may be a vector of hash values of each of the set of other public keys. Some specified minimum number of these keys must appear in certificates of other signatures applied to any object signed by A when using this new certificate. Otherwise any recipient should not treat A's signature as valid.

The counter signature list is a vector of hash values of other certificates which must be used to sign any signature made under the authority of this certificate. Since this references certificates (rather than public keys), it is possible to reference specific certificates which themselves need further joint or counter signing. By selecting appropriate certificates to appear here, it is possible to create hierarchy of counter signature requirements to whatever level an organization feels comfortable. A specified number of cosigners is required from each category. This can range from all the candidates to some subset, for example, 0, 1, 2 or 3.

The set of possible co-signers may be indicated explicitly in a list as described here, or implicitly by specifying some quality or attribute specification which is designated in each possible co-signer's certificate.

Other fields may be included in the certificate. For example, the current date and time which reflects the moment of the initial creation of the certificate. As indicated in FIG. 5, the complete certificate consists of a certificate packet with includes the certificate 116 for A and the signature packet 114 of B's signature to A's certificate.

B's signature and the hierarchy of all certificates and signatures which validate it are kept by A and sent along whenever A uses his certificate. It is contemplated that B or other parties may create several certificates for A. For example, one certificate might allow A to reliably identify himself with no further designated authority. Another certificate might allow authorization to A of certain limited money amounts without requiring any cosignatures. A third might allow authorization for larger amounts but require one or more cosignatures. Still another might allow A to subcertify other persons according to still different money and/or authority limitations and/ or co-signature specifications.

Assuming that B has created a certificate for A as shown in FIG. 5, if B requires no cosigners then the certificate is complete. However, the certificate which empowered B to create A's certificate may have required that B have cosigners. There may be one or more joint signature and/or counter signature requirements.

FIG. 6 exemplifies the steps taken by party C to jointly certify the certificate of A. The requirement to have a joint signer would be specified in B's own certificate. In this case, a transmitted object (in this case A's new certificate) signed with B's certificate would be rejected by a recipient if C's joint signature is not also present on the object.

As shown in FIG. 6, if such a joint signature is required, a copy of B's certificate for A is sent to C who must jointly sign the certificate 120. C then examines A's certificate 122 and verifies that the public key of the certificate actually belongs to A in accordance with process outlined in conjunction with FIG. 3.

C then examines the signed attributes and authorizations set forth in the certificate including the assigned monetary level, trust level, etc. C then, upon concluding that all the fields in B's certificate for A are appropriate, selects his own certificate with which to perform the signature 126. With his own certificate 128, C signs B's certificate of A 132 (130). Once C signs his certificate his signature appears essentially parallel with B's signature and any other cosigners as shown at 134 and 136 of FIG. 6. Thus, it is important that C exercise as much caution as B when approving A's certificate. Once A's certificate is created no cosigner may change the certificate for to do so would create essentially a different object to which none of the previous signatures would apply. If C does not approve the certificate he must avoid signing it, and should have a different certificate constructed and re-signed by all necessary parties. After C adds his joint certificate to B's certificate of A, A's certificate packet consists of the certificate for A 132, B's signature packet for A's certificate 134 and finally C's signature packet for A's certificate 136.

In regard to C's signature packet, it is noted that, in order for C to validly sign the certificate, he must select one of his own certificates which grants him sufficient authority to cover what is specified in the new certificate for A. If C has no such certificate, then it is impossible for him to validly sign the certificate since future recipients would reject his certificate as having insufficient authority.

It is noted that C's certificate may also require a counter signature by another party. If so, C forwards the certificate and all associated signatures to the specified party, e.g., D, to counter sign C's signature. When D receives the material he performs the same verification steps as C on the new certificate. If he approves, then D adds his signature to the set. However, D signs C's signature rather then the original certificate object. That is, the object of D's signature is not the object of C's signature (which in this case was the certificate for A) but rather the object is C's signature itself. This counter signature therefore differs from the joint signature which is simply another signature of the same object.

The application of joint and/or counter signatures can be nested to whatever depth is required, Thus, if D is required to have joint signatures, then this package should be passed to one of D's candidate joint signers for approval of C's signature. This would be a joint counter signature. Similarly, in organizational hierarchies it is possible that D might require counter signatures in which case someone else will need to sign D's signature.

As explained above, the recipient of a primary object (such as a purchase order) and its associated signatures, processes the received materials to insure that the object is identical to the material which existed as it was signed by the owner of the public key. The process for verifying the signature and for verifying that the object had not been tampered with has been explained above in regard to FIG. 3.

Additionally, the recipient needs to verify that the identity of the signer is correct and further that the signer has the proper authority within his organization to make the commitments implied by the received object. The sender of the object (e.g., the purchase order) has the responsibility of sending all generations of antecedent certificates and signatures (up to and including the meta-certificate) which are needed for a recipient to perform validation operations.

In validating the object and its signatures, the recipient may, for example proceed as follows. First the recipient insures that the primary object 150 has at least one signature. In the example shown in FIG. 7, the primary object 150 has four associated joint signatures 152, 168, 180 and 200, each of which has associated certificates 154, 170, 182 and 202 respectively.

Certificate 154 was made requiring joint signatures by the owners of certificates 170, 182 and 202, and counter-signatures by the owners of certificates 162 and 166 using these specific certificates. The certificate 154 itself was authorized by the owner of certificate 158 as evidenced by signature 156.

In this example, the owner of 154 has obtained the necessary counter signatures 160 and 164 by the holders of certificates 162 and 166, as well as the necessary joint-signatures 168, 180 and 200.

To provide validation for his signature 168, the owner of certificate 170 must include the authorization for his certificate. His certificate was signed by the holder of certificate 174 (as evidenced by 172), however 174's certificate specified that a joint signature by the owner of 178 was required in order to fully ratify 174's signature 172. Thus signature 176 which was made sometime in the past, fulfilled all of 174's joint signature requirements and thereby validated (ratified) the use of 170.

Looking at joint signature 180, by the owner of 182, we learn that 182 requires counter signatures by the holder of 186 using the specific certificate 186. The holder of 182, did in fact get the counter-signature 184 by the holder of 186. However, certificate 186 requires that any signature by 186 itself be countersigned by the holders of certificates 190 and 194 (using these respective certificates). These two holders have in fact countersigned 184 as evidenced by 188 and 192. At one further level we learn that certificate 194 requires any signature by 194 be counter signed by the holder of certificate 198, which signature 196 has been obtained. Certificate 202 requires no co-signature.

All certificates must be accompanied by signatures which are themselves authorized by antecedent certificates. Ultimately all the authority can be traced to a set of certificates which have been signed by the holder of the meta-certificate (or possibly a small set of meta-certificates). Each meta-certificate is well known and distributed to all parties "throughout the world".

The recipient examines every signature supplied and verifies that each accurately signs its purported object (whether the object is a primary object, a certificate, or another signature) using the procedure detailed in FIG. 3. The recipient insures that each signature includes a corresponding validated certificate.

If a certificate requires joint signatures, then the recipient insures that the required number of these necessary signatures (to the same object) are present. If the certificate requires counter signatures, then the recipient insures that the required number from the designated subset are present (the counter signatures have signatures as their object).

All certificates are then examined. A check is made for the special meta-certificate which has no signature but which is universally known and trusted and a copy of which is already stored in the recipient's computer. If a certificate is received which claims to be the meta-certificate but which is not equal to that already known to and accepted by the recipient, then a rejection is issued. If the meta-certificate is properly recognized, then the validation process continues.

Additionally, a check is made to insure that any other certificate besides the meta-certificate has at least one signature. As noted above, a check is made to insure that all necessary cosignatures for all presented objects are present. Additionally, a check is made to determine that antecedent certificates grant sufficient authority to the subcertificate signers to permit them to validly sign the certificate.

In this regard, the trust value in the certificate must be consistent with the antecedent (i.e., the certificate of its signers). By way of example only, the following trust field combinations are valid (using the example specified earlier).

| Antecedent Trust Value | Trust Value and Immediate Certificate |
|---|---|
| 0 | 1 |
| 0 | 2 |
| 0 | 3 |
| 1 | 2 |
| 1 | 3 |
| 2 | 2 |
| 2 | 3 |

Additionally, any monetary limitations set forth in the certificate must be observed. The money limit allowed by a certificate must not exceed its antecedent. Additionally a check should be made to insure that the antecedent's expiration date is compatible with the antecedent's expiration date. By way of example only, a check may be made to insure that the expiration date in every certificate exceeds the date of each signature which relies on it. In some cases, it may be desirable to reject any material which is controlled by an obsolete certificate.

In order to detect "closed" authority loops (by which a series of certificates may be structured in a loop with the last member of the loop granting authority to the first), it is necessary to insure that all authority ultimately flows from recognized meta-certificates. In this manner, a chain of false or artificial certificates which mutually certify each other will not be inadvertently allowed to incorrectly pass the validation process.

One way to accomplish this is to check off certificates in a series of iterations, starting at the top with the meta-certificate. At each iteration, certificates are scanned and in the process certificates having at least one checked off antecedent would in turn be checked off. The iteration stops when no new certificates have been checked off. If any certificates have not been checked off, then these are "orphans" which should never have been supplied. Such a transmitted package would be rejected.

Once the signatures and certificates are validated (based on the ultimate authority of the meta-certificate(s)), the final step is to insure that the commitment inherent in the primary object is within the authority granted to its immediate (joint) signers. This is done by considering the value imputed to the primary object with the certificates of its signers.

Although the use of a meta-certifier insures that all authority ultimately flows from a trusted source and provides protection, the present invention is not limited to a certification methodology which necessarily includes a single meta-certifier. On the other hand, it is contemplated by the present invention to allow for the use of multiple meta-certifiers. These should be certificates governed by entirely independent sources possibly reflecting the apex of entirely different authorizing hierarchies (e.g., the governmental sector versus the private sector).

Another use of multiple meta-certifiers could be to avoid concentrating full meta-certification responsibility with one group. For example, it might be uncomfortable to know that there is a single entity which could in theory create forgeries on behalf of anyone else by creating false certificates. This concern may be alleviated if the meta-certification authority were distributed among different trusted meta-certifiers. Each meta-certifier would operate completely independently but each certificate would specifically require the others as joint signers. This would essentially eliminate the possibility that isolated corruption within a single organization would compromise the system. For example, any organization that wished to be certified would need to have their own high level master certificate corroborated by each separate entity. Large organizations may likewise wish to structure their own master certificates to be constructed so as to require joint signatures in order to provide multiple safeguards against the danger of isolated corruption within the organization.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim:

1. In a communication system having a plurality of terminal devices coupled to a channel over which users of said terminal devices may exchange messages, at least some users having a public key and an associated key, an improved method for managing authority by digitally signing and certifying a message to be transmitted to an independent recipient comprising the steps of:

formulating at least a portion of a digital message;

digitally signing at least said portion of said message; and including within said message an authorizing digital certificate having a plurality of digital fields created by a certifier, said authorizing certificate being created by the steps of:

specifying by the certifier in at least one of said digital fields, the authority which is vested in the certifier and which has been delegated to the signer of said message, by including sufficient digital information to enable said independent recipient of said message to verify, be electronically analyzing said message in accordance with a predetermined validation algorithm, that the authority exercised by the signer in signing the content of said message created by the signer was properly exercised by the signer in accordance with the authority delegated by the certifier; and identifying the certifier who has created the signer's certificate in other of said digital fields by including sufficient digital information for said recipient of the message to determine by electronically analyzing said message that the certifier has been granted the authority to grant said delegated authority.

2. A method according to claim 1, further including the step of providing at least one digital field in said message identifying the nature of the digital data being transmitted.

3. A method according to claim 2, wherein the nature of the digital data is identified as being a digital signature.

4. A method according to claim 2, wherein the nature of the digital data is identified as being a certificate.

5. A method according to claim 2, wherein the nature of the digital data is identified as being a business document 6. A method according to claim 1, wherein the formulating step includes the step of providing a digital field allowing the user to insert a predetermined comment regarding the data being transmitted.

7. A method according to claim 1, further including the step of applying a hashing function to at least a portion of the message to be transmitted to form a presignature hash; and wherein said digitally signing step includes the step of processing said presignature hash with the signer's private key to form said digital signature.

8. A method according to claim 7, further including the step of forming a digital signature packet comprising the digital signature and a representation of said at least a portion of the message to be transmitted.

9. A method according to claim 1, wherein said authorizing certificate includes digital fields defining the cosignature requirements which must accompany the signer's signature in order for the signer's signature to be treated as properly authorized.

10. A method according to claim 9, wherein said digital fields defining co-signature requirements set forth a required digital signature by a specified third party indicating approval of the signer's signature to thereby define a counter signature requirement.

11. A method according to claim 10, wherein the third party countersigns by digitally signing the signer,s digital signature.

12. A method according to claim 9, wherein the cosignature requirements include a digital field specifying at least one other digital signature which is required to appear in the digital message thereby defining a joint signature requirement.

13. A method according to claim 1, wherein said authorizing certificate includes at least one digital field defining limitations as to the authority granted by the certificate.

14. A method according to claim 1, wherein said authorizing certificate defines the plurality of the signer.

15. A method according to claim 13, further including the step of specifying a monetary limit for the signer in a digital field in said certificate.

16. A method according to claim 1, wherein said authorizing certificate includes at least one digital field defining a trust level indicative of the degree of responsibility delegated to the signer by the certifier.

17. A method according to claim 1, wherein said identifying step includes the step of specifying in digital fields in said authorizing certificate a hierarchy of certificates, whereby a recipient of the message can electronically verify in accordance with a predetermined validation algorithm the authority of the signer based upon an analysis of the signed message.

18. A method according to claim 1, wherein said step of creating an authorizing certificate includes the steps of creating a certificate by a certifier, whereby the certifier signs the certificate by using the private key associated with one of the certifier's own certificates.

19. A method according to claim 1, including the step of transmitting a plurality of certificates, and wherein at least one of the transmitted certificates is a meta-certificate, where a meta-certificate is a digital authorizing certificate from which authority flows which originates from a trusted source commonly known to both the signer and prospective recipients.

20. In a communications system having a plurality of terminal devices coupled to a communications channel over which users of said terminal devices may exchange messages, at least some of said users having a public key and an associated private key, an improved method of digitally signing and certifying a message to be transmitted for managing authority comprising the steps of:
formulating at least a portion of a digital message;
digitally signing at least said portion of said message;
including within said message an authorizing digital certificate having a plurality of digital fields created for the signer by a certifier, said authorizing certificate being created by the steps of:
specifying by the certifier in at least one of said digital fields at least one party whose digital signature, in addition to the signer's signature, is required to be transmitted with said message in order for said signer's signature to be treated as properly authorized; and
identifying the certifier who has created the signer,s certificate in other of said digital fields by including sufficient digital information to enable the recipient of said message to determine by electronically analyzing said message that the certifier has been granted the authority to certify the signer's certificate.

21. A method according to claim 20, wherein said certificate includes digital fields representative of a list of each of the public keys of the parties at least one of which is required to cosign any message signed with the authority of the certificate.

22. A method according to claim 20, wherein said certificate includes digital fields representative of a list of public keys of the parties at least one of which may be required to sign any message created under the authority of said certificate and a field defining the minimum member of such signatures which must appear in said message in order for the signer's signature to be treated as properly authorized.

23. A method according to claim 20, wherein said certificate includes digital fields representative of a list of each of the certificates of the parties at least one of which is required to sign any message created under the authority of said certificate.

24. A method according to claim 20, including the step of including digital fields in said message associating with each digital signature in said message an authorizing certificate generated by a certifying party which specifies the authority which has been granted to the message sender.

25. A method according to claim 21, further including the steps of transmitting said message including said certificates and verifying at the recipient,s terminal device each signature through the use of at least one public key.

26. A method according to claim 20, wherein said step of including an authorizing certificate includes the step of defining a hierarchial ladder of certificates within digital fields in the transmitted message, whereby a recipient of the message can electronically verify in accordance with a predetermined validation algorithm the authority of the sender based upon an analysis of the signed message.

27. A method according to claim 20, further including the step of creating an authorizing certificate by a certifier, wherein the certifier creates a certificate by signing the certificate by using the private key associates with one of the certifier's own certificates.

28. A method according to claim 20, further including the step of providing at least one field in said message identifying the nature of the digital data being transmitted.

29. A method according to claim 28, wherein the nature of the digital data is identified as being a digital signature.

30. A method according to claim 28, wherein the nature of the digital data is identified as being a digital certificate.

31. A method according to claim 20, further including the step of applying a hashing function to at least a portion of the message to be transmitted to form a presignature hash; and wherein said digitally signing step includes the step of processing said presignature hash with the signer's private key to form said digital signature.

32. A method according to claim 20, wherein said authorizing certificate includes at least one digital field defining the requirement of at least one digital signature by at least one third party indicating approval of the sender's signature, thereby defining a countersignature requirement, wherein the third party countersigns by digitally signing the sender's digital signature.

33. A method according to claim 20, wherein said authorizing certificate includes at least one digital field specifying at least one additional party required to sign said portion of the digital message to thereby define a joint signature requirement.

34. A method according to claim 20, wherein said authorizing certificate includes at least one digital field defining limitations as to the authority granted by the certificate.

35. A method according to claim 34, wherein said limitations includes a monetary limit for the signer.

36. A method according to claim 20, wherein said authorizing certificate includes at least one digital field indicative of the degree of responsibility delegated to the signer by the certifier.

37. A method according to claim 36, wherein said at least one field defines a trust level indicating the degree of responsibility the certifier is willing to assume for subcertification done by the signer.

38. A method according to claim 20, wherein said authorizing certificate includes at least one field identifying the signer.

39. A method according to claim 20 further including the step of transmitting a plurality of certificates, and wherein at least one of the transmitted certificates is a meta-certificate where a meta-certificate is a digital authorizing certificate from which all authority flows, said meta-certificate originating from a trusted source commonly known to both the signer and the recipient.

40. A method of digitally signing and certifying a sender's message to enable a recipient to determine that the send-r is properly authorized comprising the steps of:
specifying in at least one digital field in an authorizing digital certificate created by a certifier the delegated authority which has been granted to the sender, said authorizing certificate including a plurality of digital fields;
identifying in other of said digital fields in said certificate the identity of the certifier by including sufficient digital information for said recipient to determine that the certifier has been granted the authority to grant the delegated authority;
transmitting a message to said recipient having at least one digital signature, said message including said digital certificate which specifies the authority which has been granted to the sender;

receiving said message by said recipient and validating the identity of the sender by electronically analyzing the at least one digital signature; and determining the authority which has been granted to the sender by analyzing the delegated authority information specified in said authorizing certificate and determining by electronically analyzing said digital fields that said certifier has been granted the authority to grant said delegated authority.

41. A method according to claim 40, wherein said at least one digital signature is created by computing a presignature hash and said step of validating the identity of the sender including the step of recomputing said presignature hash with the received message, encrypting the signature to be verified, comparing the recomputed presignature hash and said encrypted signature to be verified; and rejecting said signature if there is not a match.

42. A method according to claim 41, wherein said encrypting operation is performed with the sender's public encrypting key.

43. A method according to claim 40, further including the step of electronically verifying by a predetermined verification algorithm that the received message is identical to the message as it was initially signed.

44. A method according to claim 40, further including the steps of:

specifying in digital fields in said message at least one digital signature in addition to the signer's signature required to be transmitted;

transmitting said at least one digital signature required to be transmitted and at least one associated certificate;

electronically examining, upon receipt of said message, all received digital certificates and signatures; and determining in accordance with a predetermined validation algorithm that all necessary signatures are present and that the sender is properly authorized based on data contained in said certificates.

45. A method according to claim 40, wherein said authorizing certificate includes at least one field defining the identity of the signer.

46. A method according to claim 40, further including transmitting a plurality of certificates and wherein at least one of the transmitted certificates is a meta-certificate, where a meta-certificate is a digital authorizing certificate from which authority flows which originates from a trusted source commonly known to both the signer and the recipient.

* * * * *

UNITED STATES PATENT AND TRADEMARK OFFICE
CERTIFICATE OF CORRECTION

PATENT NO.   :   4,868,877

DATED        :   September 19, 1989

INVENTOR(S)  :   Addison M. Fischer

It is certified that error appears in the above-identified patent and that said Letters Patent is hereby corrected as shown below:

Column 19, line 23, after "some" insert -- of said--;
after "associated" insert -- private--;

Column 19, line 39, delete "be" and insert --by--.

Column 20, line 23, delete "signer,s" and insert --signer's--;

line 35, delete "plurality" and insert --identity--.

Column 21, line 15, delete "signer,s" and insert -- signer's--;

Column 21, line 32, delete "member" and insert --number--;

Column 21, line 49, delete "recipient,s" and insert --recipient's--.

Column 22, line 53, delete "send-r" and insert --sender--.

Signed and Sealed this

Twentieth Day of August, 1991

Attest:

HARRY F. MANBECK, JR.

*Attesting Officer*  *Commissioner of Patents and Trademarks*